United States Patent
Lasher et al.

(10) Patent No.: US 9,309,053 B2
(45) Date of Patent: Apr. 12, 2016

(54) CONVEYOR SYSTEM AND ASSOCIATED PRODUCT CARRIER

(71) Applicant: ABB INC., Cary, NC (US)

(72) Inventors: David G. Lasher, Debary, FL (US); Ovidio J. Orozco, Apopka, FL (US)

(73) Assignee: ABB INC., Cary, NC (US)

(*) Notice: Subject to any disclaimer, the term of this patent is extended or adjusted under 35 U.S.C. 154(b) by 151 days.

(21) Appl. No.: 14/182,343

(22) Filed: Feb. 18, 2014

(65) Prior Publication Data
US 2015/0232275 A1 Aug. 20, 2015

(51) Int. Cl.
*B23Q 7/06* (2006.01)
*B65G 13/00* (2006.01)
*F16M 11/04* (2006.01)
*F16M 11/18* (2006.01)

(52) U.S. Cl.
CPC .............. *B65G 13/00* (2013.01); *F16M 11/046* (2013.01); *F16M 11/18* (2013.01)

(58) Field of Classification Search
CPC ........................................................ B23Q 7/001
USPC .................... 269/58, 61, 65, 67, 69, 292, 295; 198/717, 727, 734; 104/172.2, 173.3
See application file for complete search history.

(56) References Cited

U.S. PATENT DOCUMENTS

| | | | | |
|---|---|---|---|---|
| 3,550,756 A | | 12/1970 | Kornylak | 198/183 |
| 4,170,345 A | * | 10/1979 | Townsend | B25H 1/08 269/203 |
| 4,354,796 A | * | 10/1982 | Bergman | B23Q 1/28 198/721 |
| 4,565,358 A | * | 1/1986 | Hosoi | B23Q 16/001 269/295 |
| 4,955,592 A | * | 9/1990 | Brennan, Sr. | E04F 21/1805 269/68 |
| 5,040,716 A | * | 8/1991 | Stetz | B23K 37/053 228/42 |
| 5,042,633 A | | 8/1991 | Jenkner | 193/35 SS |
| 5,271,706 A | * | 12/1993 | Helbach | B65G 51/03 198/746 |
| 5,411,128 A | * | 5/1995 | Vild | C03B 35/163 198/345.1 |
| 5,529,171 A | | 6/1996 | Langenbeck | 198/860.1 |
| 5,586,754 A | * | 12/1996 | Williams | B23Q 3/103 269/101 |
| 5,657,974 A | | 8/1997 | Williams | 269/93 |
| 5,709,138 A | * | 1/1998 | Rimer | B26B 29/06 83/175 |
| 5,829,356 A | * | 11/1998 | Christiansson | B61B 13/125 104/167 |
| 6,273,662 B1 | * | 8/2001 | Fleckenstein | F16M 11/10 248/371 |
| 6,340,039 B1 | * | 1/2002 | Chang | F27C 5/06 144/135.2 |
| 6,588,738 B1 | * | 7/2003 | Sukuvaara | B23K 26/06 269/293 |
| 7,578,381 B2 | | 8/2009 | Davidson | 198/370.04 |

(Continued)

OTHER PUBLICATIONS

*Conveyor Practive Guideline*; Association of Professional Material Handling Consultants, and the Material Handling Industry of America; Nov. 14, 2000.

(Continued)

*Primary Examiner* — Douglas Hess
(74) *Attorney, Agent, or Firm* — Renner Kenner Greive Bobak Taylor & Weber

(57) ABSTRACT

A conveyor system includes a conveyor table having a platform surface with opposed platform edges that form a flow gap therebetween and a plurality of conveyor mechanisms extending above the platform surface. At least one guide pin assembly is receivable in the flow gap. The guide pin assembly includes a guide pin having at least a portion thereof above the platform surface. A carrier for a workpiece includes a base, a column extending vertically from the base, and a lifting assembly carried by the column that is movable with respect to the column and adapted to carry a workpiece. The carrier may be detachably secured to the guide pin assembly so as to allow controlled movement of the workpiece along the platform surface.

19 Claims, 13 Drawing Sheets

(56) References Cited

U.S. PATENT DOCUMENTS

| | | | |
|---|---|---|---|
| 8,297,605 B2 * | 10/2012 | Lee | F16C 11/106 269/130 |
| 2006/0054452 A1 | 3/2006 | Marcelli | 193/35 R |
| 2006/0054453 A1 | 3/2006 | Marcelli | 193/35 R |
| 2012/0036705 A1 | 2/2012 | Gehris | 29/559 |

OTHER PUBLICATIONS

International Search Report mailed Apr. 17, 2015 in corresponding application No. PCT/US2015/012340.

Written Opinion mailed Apr. 17, 2015 in corresponding application No. PCT/US2015/012340.

* cited by examiner

CONVEYOR SYSTEM AND ASSOCIATED PRODUCT CARRIER

TECHNICAL FIELD

Generally, the present invention is directed to conveyor systems. Specifically, the present invention is directed to a conveyor system that facilitates controlled movement of a product carrier along a transfer table. Specifically, the present invention is directed to a conveyor system which allows controlled movement of a product carrier wherein a workpiece maintained on the product carrier can be adjustably vertically positioned.

BACKGROUND ART

Off-the-shelf conveyor systems are known for use in factory settings to transfer workpieces from one workstation to another. In the past, workpieces were placed on an off-the-shelf roller conveyer system using trays to support the weight distribution of the product. These conveyor systems allow movement in only two directions—forwards and backwards—rendering the process flow inflexible to support daily production efforts. The result of using such a conveyor system leads to production shutdowns, low production efficiencies, and problematic methods sometimes compromising personnel safety.

Past conveyor systems utilize a non-automated roller-type design. The product to be manufactured was affixed to a carrier that transferred freely on the conveyor rollers. However, there are no features on the conveyor system that allowed anchoring of the carrier. As a result top-heavy or cumbersome workpieces are prone to falling over causing damage to the workpiece and injury to the worker. To overcome this problem, a guide rail made of steel piping may be used behind the main assembly conveyor line to prevent tipping of a top-heavy product. Although some systems provide a form of anchoring, they do not allow for controlled freedom of movement of the workpiece.

In such low-volume factory settings, use of such conveyors in high-volume production is not cost effective. As a result, such operations are preferably automated with machinery and/or robotic systems. However, a significant capital cost expense is incurred for such automated systems, which is not suitable for low volumes of production. Moreover, utilizing such automated equipment is not conducive for assemblies wherein component parts have long or fluctuating lead times. In other words, such systems are impractical to implement if selected parts are not readily available, as incompleted workpieces must be set aside from the conveyor system.

Therefore, there is a need for a conveyor system that is adaptable to low production volumes. It is believed that such a system would eliminate the need to remove the product from the production line for special operations, while also enabling safe and efficient transfer of large, heavy, cumbersome workpieces. There is also a need for a system that allows for secure and safe vertical manipulation of a workpiece at selected workstations.

SUMMARY OF THE INVENTION

In light of the foregoing, it is a first aspect of the present invention to provide a conveyor system and associated product carrier.

It is another aspect of the present invention to provide a conveyor system comprising a conveyor table having a platform surface, the platform surface having opposed platform edges that form a flow gap therebetween, a plurality of conveyor mechanisms extending above the platform surface, and at least one guide pin assembly receivable in the flow gap, the at least one guide pin assembly comprising a guide pin having at least a portion thereof above the platform surface.

It is still another aspect of the present invention to provide a carrier for a workpiece comprising a base, a column extending vertically from the base, and a lifting assembly carried by the column and movable with respect to the column, the lifting assembly adapted to carry a workpiece.

BRIEF DESCRIPTION OF THE DRAWINGS

These and other features and advantages of the present invention will become better understood with regard to the following description, appended claims, and accompanying drawings. Further, in the accompanying drawings and description that follow, like parts are indicated throughout the drawings and written description with the same reference numerals, respectively. The figures may or may not be drawn to scale and proportions of certain parts may be exaggerated for convenience of illustration.

DETAILED DESCRIPTION OF THE INVENTION

Figure 1:
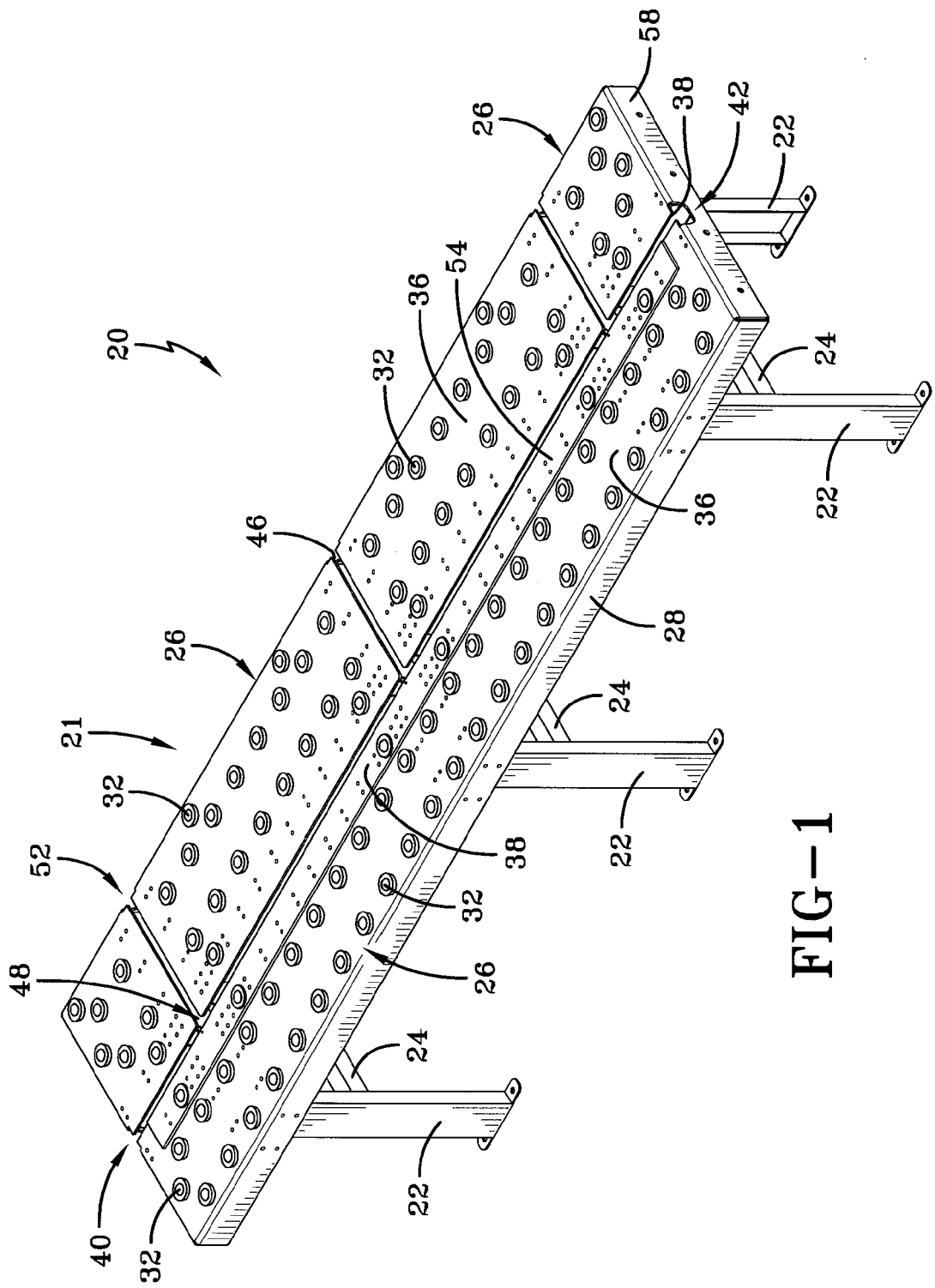
FIG. 1 is a perspective view of a conveyor table that is part of a conveyor system made in accordance with the concepts of the present invention.
Figure 2:
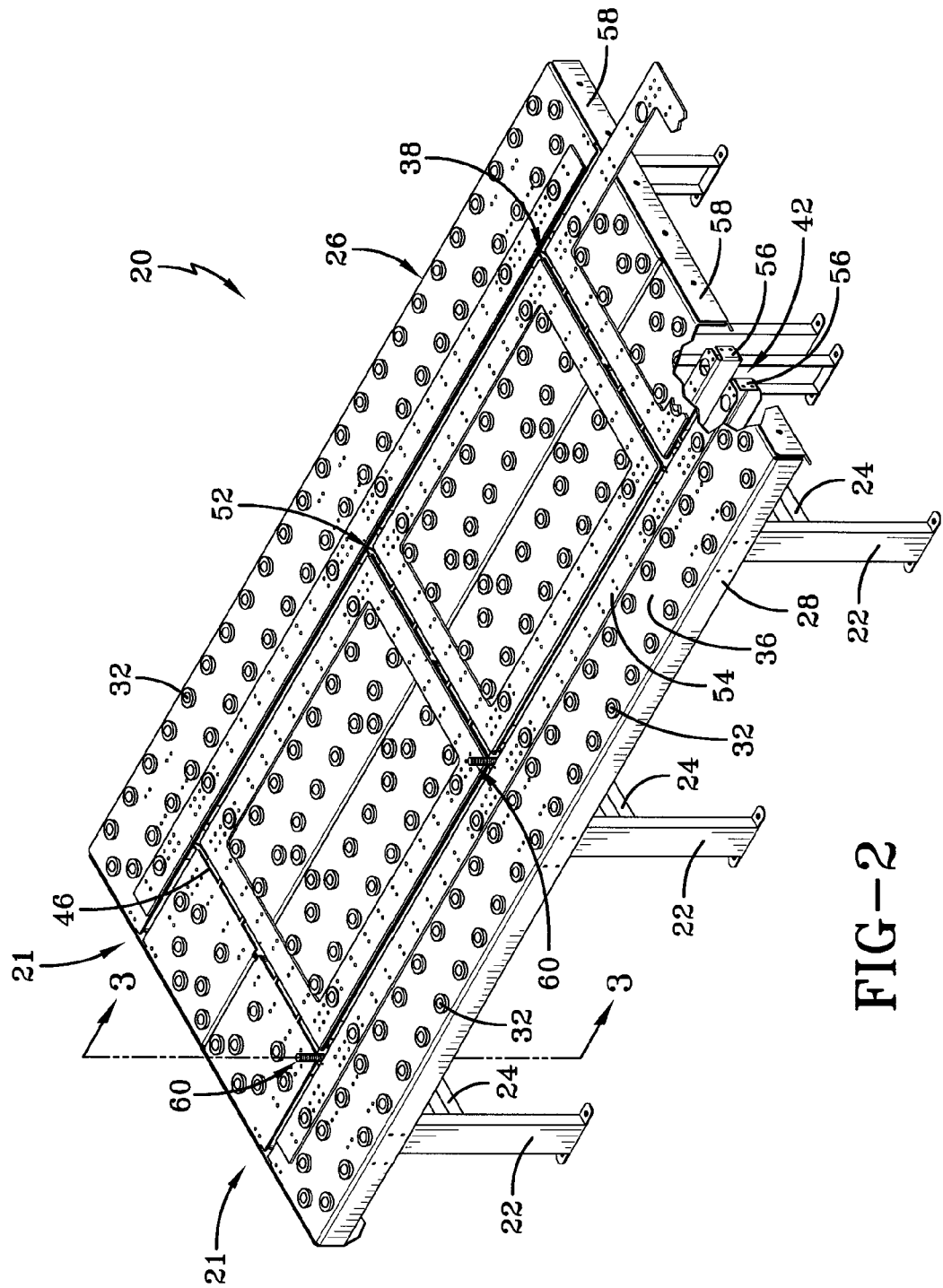
FIG. 2 is a partial perspective end view of the conveyor table with selected components removed to illustrate structural features of the table in accordance with the concepts of the present invention.

Referring now to the drawings, and in particular to FIGS. 1 and 2, it can be seen that a conveyor system according to the concepts of the present invention is designated generally by the numeral 20. As will become apparent as the detailed description proceeds, the conveyor system and an associated product carrier optimizes production flow by including a manual return line with multiple optional cross-points designed for off-line processing without the need to physically remove the product from the manufacturing line. This system enables smooth transfer of product carrier fixtures in any lateral direction using a guide pin assembly that both anchors the carrier to the table and provides a means to easily slide or move the product along its defined path. The carrier design allows for full lateral movements, 360 degree rotation of the product carrier, and an adjustable vertical travel height span of up to 12 inches. Of course, other travel height spans could be configured. The conveyer system and associated product carrier are designed as a non-automated device for use in low-volume production operations and with the exception of the height adjustment, its movement can be controlled by human forces. The disclosed conveyor system provides for easy accessibility, ergonomic positioning and functional operation.

As best seen in FIG. 1, the conveyor system 20 includes a conveyor table 21. The table is supported by table legs 22 wherein leg braces 24 may connect opposed table legs to one another. The braces 24 may also be used to support legs on the same edge of the table. In most embodiments, the leg braces 24 will be horizontally positioned at about a midpoint of the table legs, but other angular positioning of the braces could be provided. It will further be appreciated that the table legs 22 may be provided with perpendicularly extending feet that have corresponding holes which allow for the table 21 to be secured to a factory floor or other supporting surface.

The conveyor table 21 provides a table platform 26 which includes table edges 28. The edges 28 provide for sides of the platform that are typically linear. However, some embodiments may provide for table edges which are curvilinear. Carried by the table platform 26 are a plurality of conveyor mechanisms 32. In one embodiment, the conveyor mechanisms 32 may be imbedded drop-in style omnidirectional load-bearing ball-transfers such as manufactured by Hudson Bearings, part number MBT-1CS. Such mechanisms may be strategically positioned on the table platform 26 so as to provide adequate support for any product carrier that is moved along the conveyor table 21. Skilled artisans will appreciate that the number of mechanisms 32 is selected so as to ensure adequate movement but without providing an excessive number. Skilled artisans will further appreciate that alternative conveyor mechanisms such as roller tubes could be utilized but it will be appreciated that such mechanisms do not allow for easy lateral movement of a carrier along the length of the roller tube.

Figure 3A:
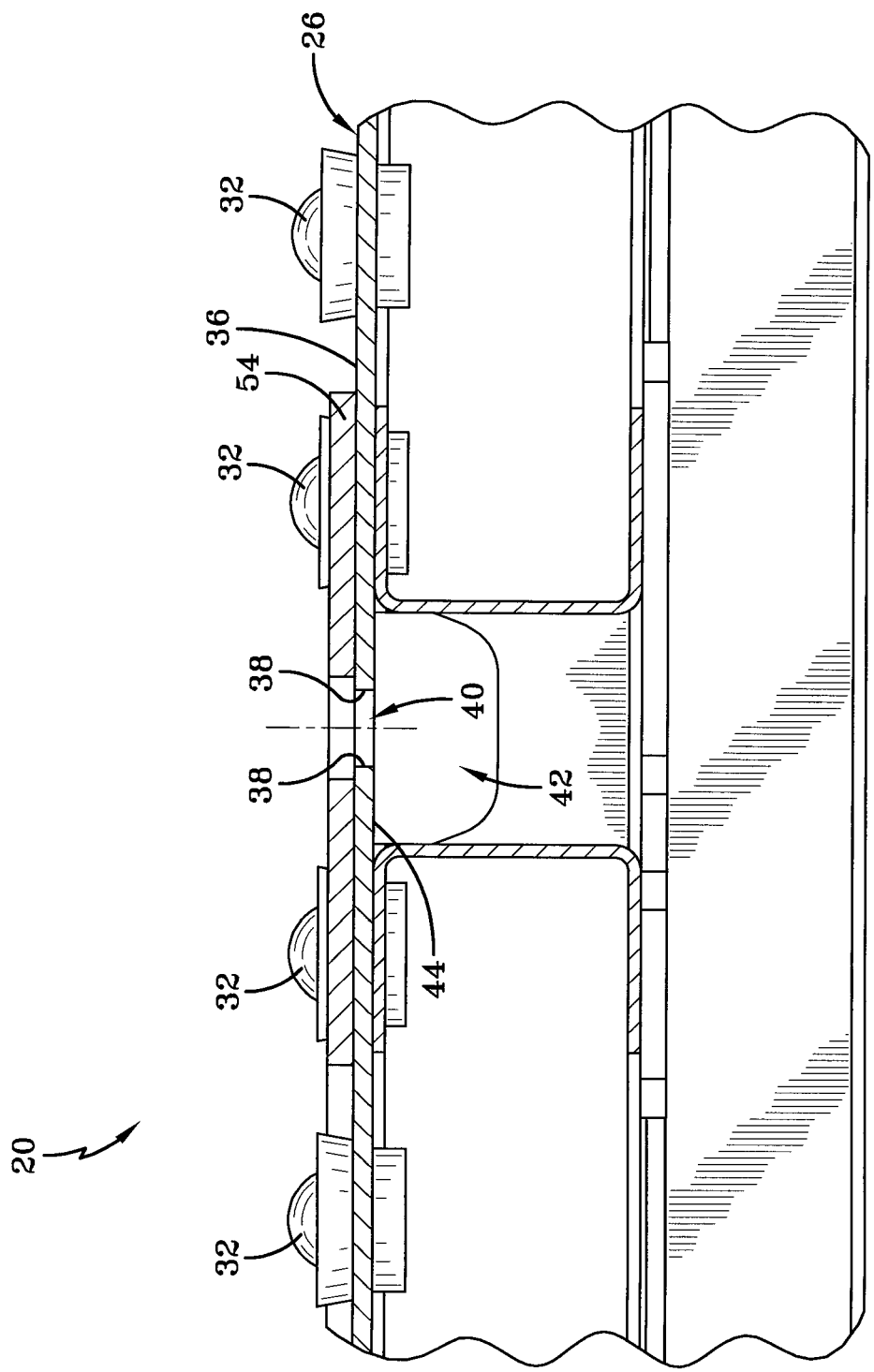
FIG. 3A is a cross-sectional view of the table and FIG. 3B is a cross-sectional view of the table and an associated guide pin assembly secured to a carrier in accordance with the concepts of the present invention.
Figure 3B:
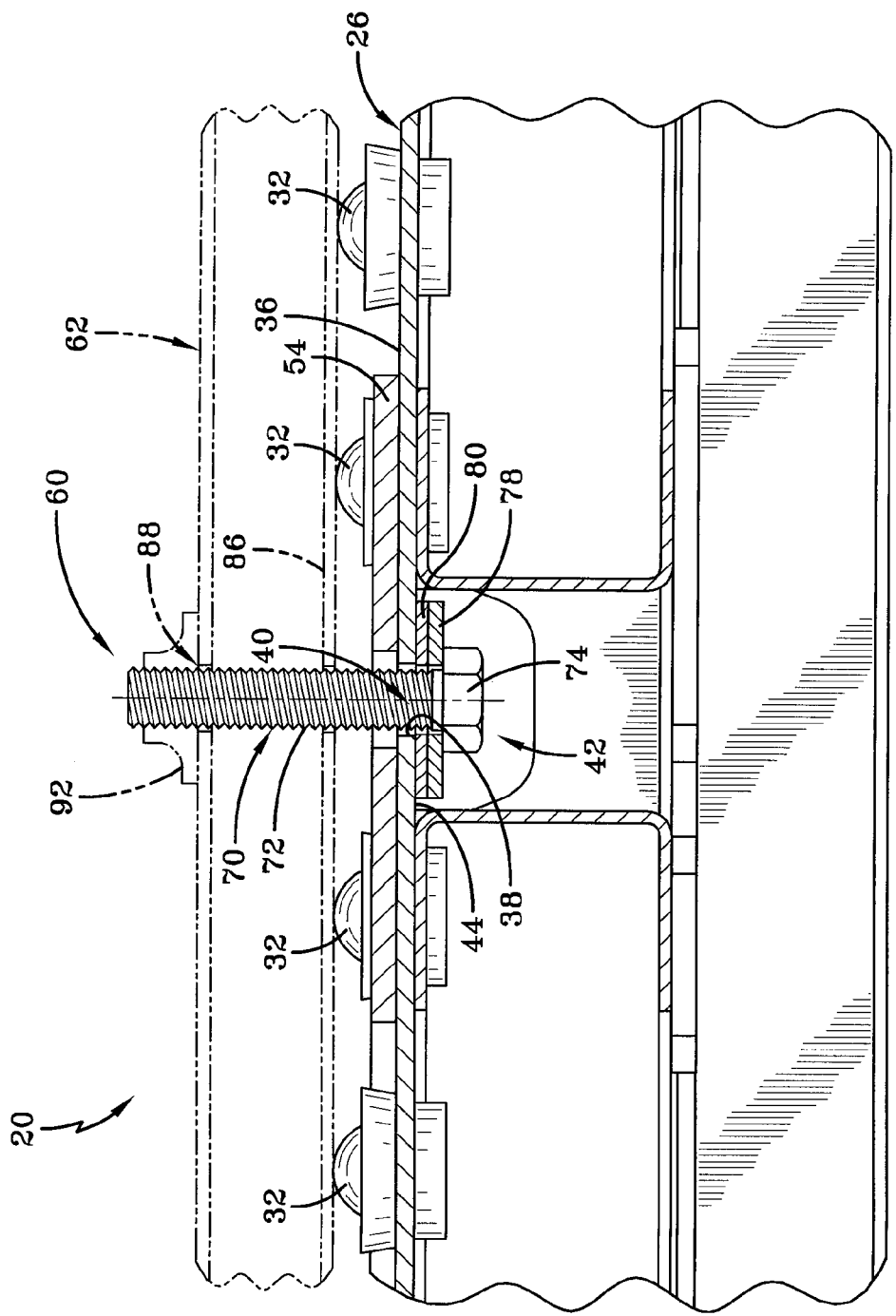

As best seen in FIGS. 2, 3A and 3B, the table platform 26 provides a platform surface 36. The platform surface 36 includes platform edges 38 which are substantially perpendicular thereto. Skilled artisans will appreciate that the platform edges 38 are not the table edges 28 which are disposed about the outer periphery of the table platform 26 although the edges 28 and 38 may be aligned or flush with one another. In any event, platform edges 38 that face one another form a flow gap 40 therebetween. Contiguous with the flow gap 40 is a flow channel 42 which is disposed underneath the platform surface 36. The flow gap 40 and associated channel 42 are relatively linear and, in most embodiments, are parallel with the table edges 28. However, in some embodiments, the flow channel 42 and flow gap 40 may be a curvilinear configuration.

The platform surface 36 may provide a platform underside 44 which forms a topside of the flow channel 42. As best seen in FIG. 2, the platform surface 36 may have angular platform edges 46 which are connected to or extend from the platform edges 38. The angular platform edges 46 form a cross-flow gap 48 which provides for a corresponding cross-flow channel 52 contiguous therewith. The cross-flow channels 52 may intersect with the flow channels 42. It will further be appreciated that multiple tables 21 may be positioned side-by-side so as to allow for extension of the cross-flow channel between aligned adjacent tables. Such a configuration enables any number of specific product flow paths to be configured.

A marker 54 may be secured to the platform surface 36 and may be aligned along the platform edge 38 and/or the angular platform edges 46 so as to clearly set out to a user the path that the flow channel 42 and cross-flow channels 52 may take along the conveyor table 21. In some embodiments, the marker may be of a substantially different color than the platform surface 36 or the table platform 26. The marker 54, which may be in the form of a strip made of steel or other like material, reinforces the platform surface 36. In some embodiments, the marker 54 may form the entirety of the platform surface 36 and is distinguishable from the table platform 26. It will further be appreciated that the conveyor mechanisms 32 may extend through the marker 54 but that all the conveyor mechanisms 32 are provided at a same height so as to form a substantially planar surface. In other words, the conveyor mechanisms are aligned with one another relative to the platform surface 36 so as to provide a planar orientation for any relatively flat object that is carried by the conveyor table 21. As such, all the ball-transfers of the conveyor mechanisms 32 covered by a relatively flat object come in contact with or almost come in contact with an underside of the object. The marker 54 may be used to secure and interconnect the adjacent tables to one another.

The flow channels 42 may extend up to and through the table edges 28. The table edge 28 may provide an outwardly extending channel flange 56 to which may be mounted a table end piece 58 so as to enclose the flow channel 42 and/or cross-flow channel 52 if the channel 52 extends all the way to the adjacent edge of the table. The end piece 58 may be permanently secured to the flanges 56 or may be temporarily secured so as to allow for receipt of other components of the system. Threaded fasteners or other detachably secure mechanisms may be employed to secure the end piece 58 to the flanges 56.

Referring now to FIGS. 3A and 3B, it can be seen that the conveyor table 21 is configured to receive and carry a guide pin assembly designated generally by the numeral 60. The guide pin assembly 60 connects or is otherwise secured to a carrier 62 that holds, and otherwise supports a workpiece 64 (to be discussed). Briefly, the guide pin assembly 60 and carrier 62 carry the workpiece 64 along the conveyor mechanisms supported by the platform surface 36 in a desired direction in such a way that the workpieces easily move in a controlled manner. The workpiece 64 may be any product that can be moved along a production assembly. In one embodiment, the workpiece is a cabinet in which various electrical components are assembled to one another within the cabinet.

The guide pin assembly 60, as best seen in FIG. 3B, includes a guide pin 70 which has a shaft 72. In some embodiments, the shaft 72 may be threaded but, in other embodiments, it may be provided with notches or other indentations. The shaft may also be provided in a smooth construction. It will further be appreciated that the shaft 72 is of a cylindrical configuration but that in some embodiments, it could be any other desired shape. Extending from the shaft is a head 74 which may be hex-shaped or the like. In any event, the shaft 72 is sized so as to be slidably received in the flow gap 40 or the cross-flow gap 48. The head 74 is sized to be larger than the flow gap 40 and/or the cross-flow gap 48 and is received in the flow channel 42 or the cross-flow channel 52. As a result, the guide pin 70 can move along the flow channel 42 and/or cross-flow channel 52, but the guide pin 70 cannot be pulled axially out of the channel as the head is effectively retained by the platform underside 44. In one embodiment, at least one washer 78 is disposed between the head 74 and the platform underside 44. In other embodiments, a low-friction washer 80 may be interposed between the washer 78 and the head 74. Indeed, in some embodiments, only a low-friction washer 80 may be disposed between the head 74 and the platform underside 44. In some embodiments, the low-friction washer is an oil-impregnated construction and in other embodiments, it is a ultra-high-molecular-weight polyethylene material. In any embodiment, the washer 80 serves as a low-friction guide for lateral transfer of the guide pin assembly 60.

Figure 4:
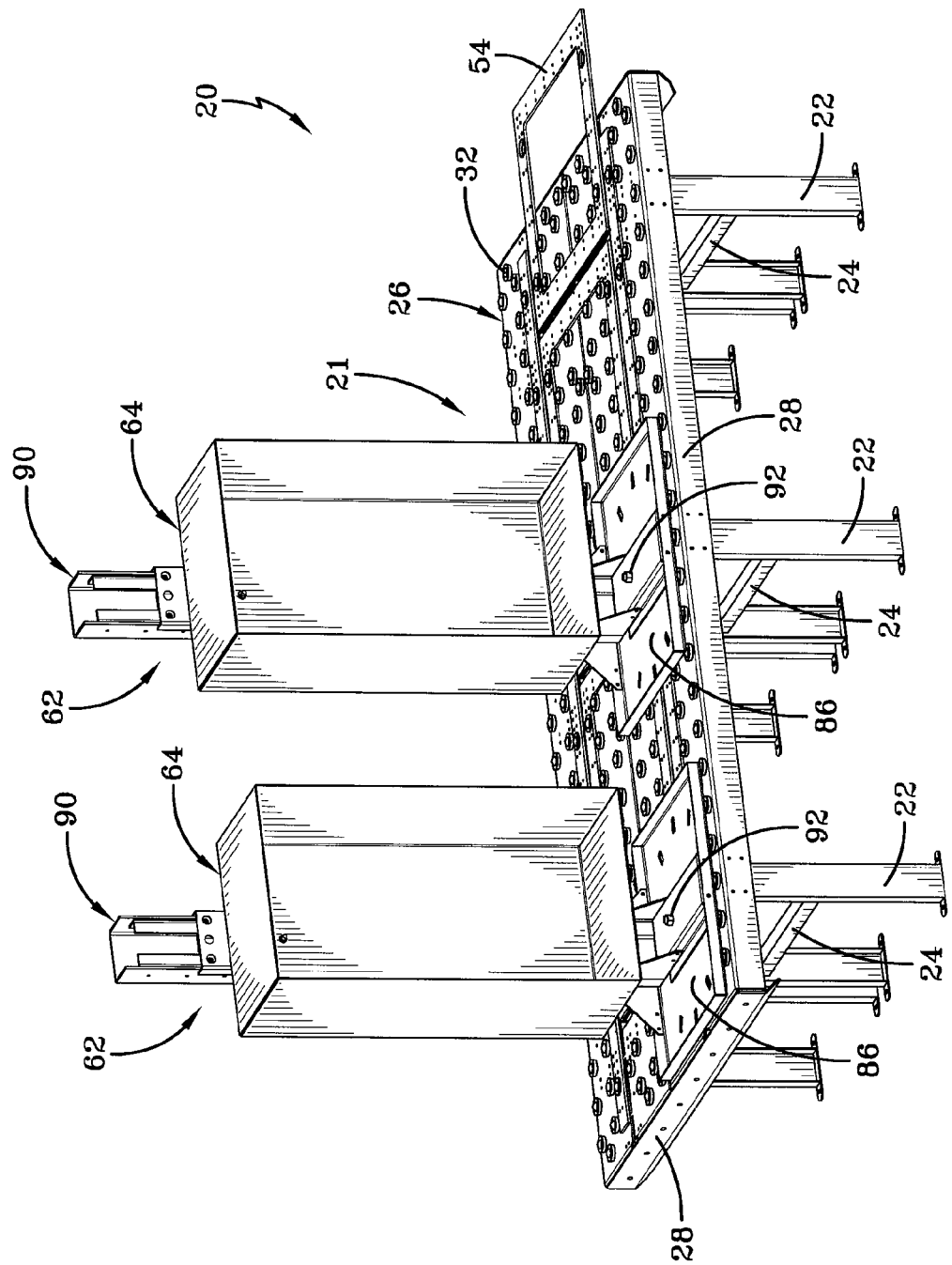
FIG. 4 is a perspective view of a conveyor system and associated product carrier made in accordance with the concepts of the present invention.

As seen in FIGS. 3B and 4, the carrier 62 includes a base 86, which has a pinhole 88 extending therethrough. In most embodiments, the pinhole 88 is disposed in about the center of the base, but it will be appreciated that one or two pinholes may be provided and that the pinholes may be provided in strategic locations about the base. Extending from one edge or side of the base 86 is a column 90 which may be adapted to carry the workpiece 64.

The guide pin assembly 60 slidably secures the carrier 62 to the conveyor table 21. A nut 92 is attachable to the shaft 72 of the guide pin assembly 60. In most embodiments, the nut 92 is threaded so as to mesh with the threads provided on the shaft 72. As such, the base 86 is slidably secured to the table by fastening the threaded nut 92 onto the shaft. As a result, an underside of the base 86 is brought into contact with the plurality of mechanisms 32. The tightening of the nut 92 onto the shaft forces the base 86 onto the conveyor mechanisms 32 resulting in a fairly even distribution of the weight or other downward forces of the carrier and the workpiece through the base and onto the conveyor mechanisms that engage the underside of the base. The low-friction washer allows the carrier 62 to be secured to the table, but also allows the carrier 62 to move laterally along the table and, if needed, the carrier can be rotated 360° in place or as the carrier moves along the channels. If more than one guide pin assembly is used, then the ability to rotate the carrier is somewhat restricted. As noted previously, the marker 54 may reinforce the platform surface 36 along either side of the flow channel 42 or cross-flow channel 52. This reinforcement counters any forces exerted by the carrier 62 and/or the workpiece through the guide pin assembly 60 and specifically the washer 80. As a result, the workpiece 64 and carrier 62 are prevented from tipping due to their possible top-heavy weight distribution.

In one embodiment, the conveyor system consists of a conveyor table 21, which may be sized to be about 2 feet wide by about 8 feet long, and which can be expanded into multiple connectible sections based on the number of channel runs needed to effectively run production of a particular product. In most embodiments, the table is constructed primarily of 7-gauge mild steel wherein flow channels are provided to allow for routing of the through-bolt guide pin assembly 60 along a user-defined path maintained by the channels 42 and/or 52. Such a configuration allows for movement of a workpiece by manual operation. Embedded into the table top is a series of drop-in-style omnidirectional load-bearing conveyor mechanisms in the form of ball-transfers. These mechanisms are designed to provide a smooth flow and a steady workstation surface. As a result, placing two tables side-by-side allows for a main work line and a return line wherein the product is transferred along a cross-flow path to the return line. Of course, any number of tables may be positioned end-to-end and/or side-by-side to set up a desired work flow pattern. Skilled artisans will appreciate that the ball-type transfer mechanisms provide opposite forces to the product carriers and are limited only by the combined weight of the product and the surface area of the opposing carrier base. It will further be appreciated that the guide pin assemblies may include low-friction washers that are captured on the underside 44 of the platform surface 36 so as to assist in the smooth flow of the carrier along its path and also a means to anchor the product carrier to the table surface. These features work together to provide for a manually initiated smooth transfer of product with adjustable restricted flow and direction and wherein the anchored product promotes flexibility, ease-of-use, simplified workflow, a higher level of personnel safety, and a single-point contact for rotation control. It will further be appreciated that the tables may be configured to allow for multi-access movement and, when coupled with a guide pin assembly as shown and described, a product may be moved along any defined path, can be rotated, and may be adjusted to multiple height settings by adjusting the height of the table legs.

Referring now to FIGS. 5-8, it can be seen that the carrier 62 includes a substantially planar horizontally-oriented planar base 86. Disposed about the peripheral edge of the base 86 is a tray edge 96. Skilled artisans will appreciate that the tray edge 96 functions to strengthen the base, prevent warping, and allows for retention of some sundry pieces that may be associated with the workpiece that is mounted to the carrier 62. The base 86 may be provided with a plurality of slots 98, which may receive clamping pins 102 so as to temporarily hold the carrier in a fixed position on the table platform 26. It will further be appreciated that the slots 98 may be adapted to receive guide pin assemblies, provided the slots are aligned with a channel 42/52, so as to further distribute forces of the carrier to the underlying table. A tray bracket 100 may extend from a bottom edge of the column 90 to a front tray edge 96 so as to provide further stability to the base 86. Extending between a rear tray edge 96 and the column 90 may be a pair of rear column gussets 104. These gussets provide for further stability of the column 90 with respect to the base 86. Extending in a substantially perpendicular direction with respect to the rear column gussets 104 are a pair of column tray gussets 106. The gussets 106 include an angled surface 108 extending from the base 86 to a flat surface 110, which extends substantially perpendicularly from the column 90. In the embodiment shown, the column tray gussets 106 are secured to opposed edges of the tray bracket 100.

Figure 5:
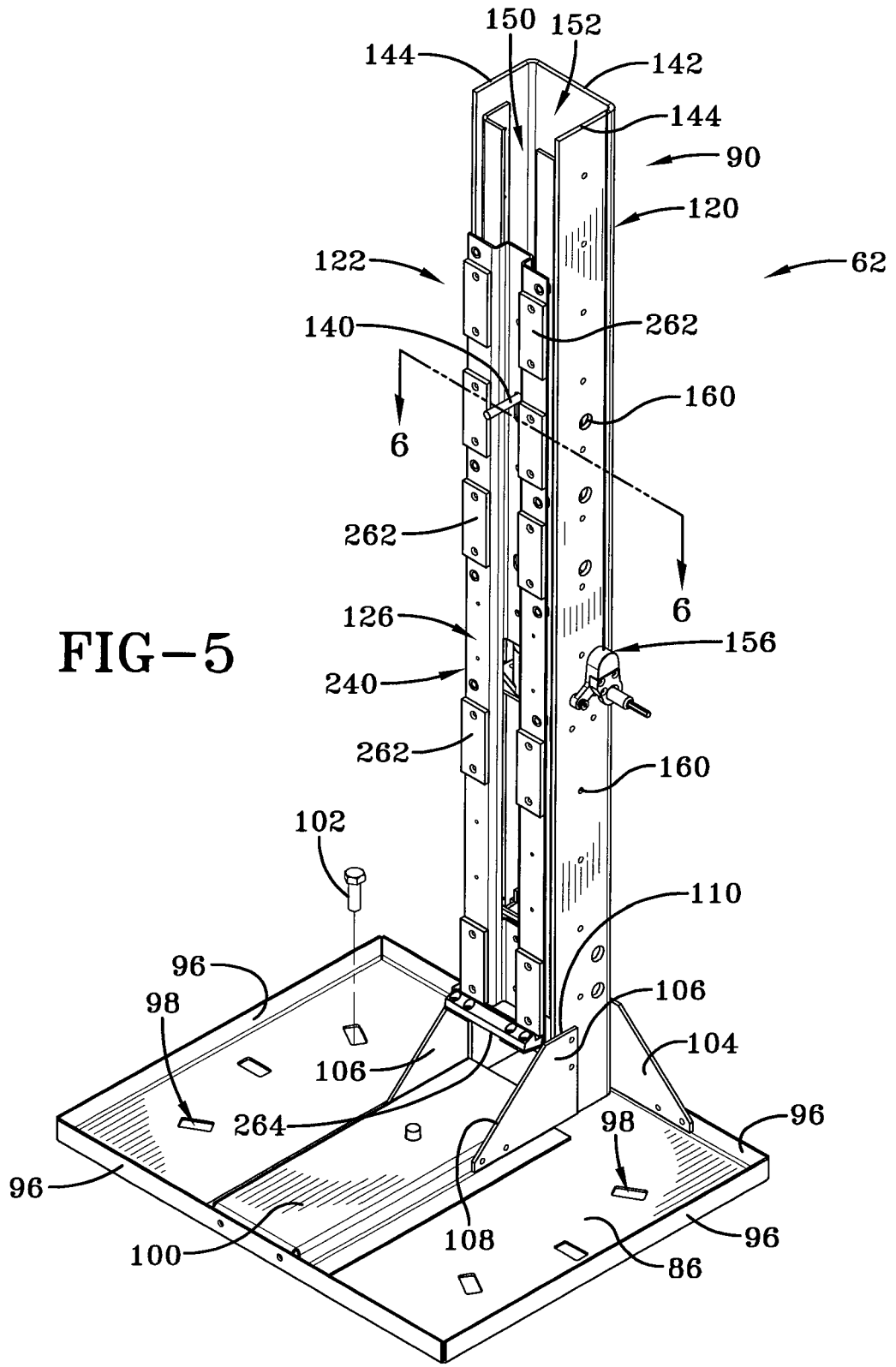
FIG. 5 is a perspective view of a product carrier utilized with the conveyor system in accordance with the concepts of the present invention.
Figure 6:
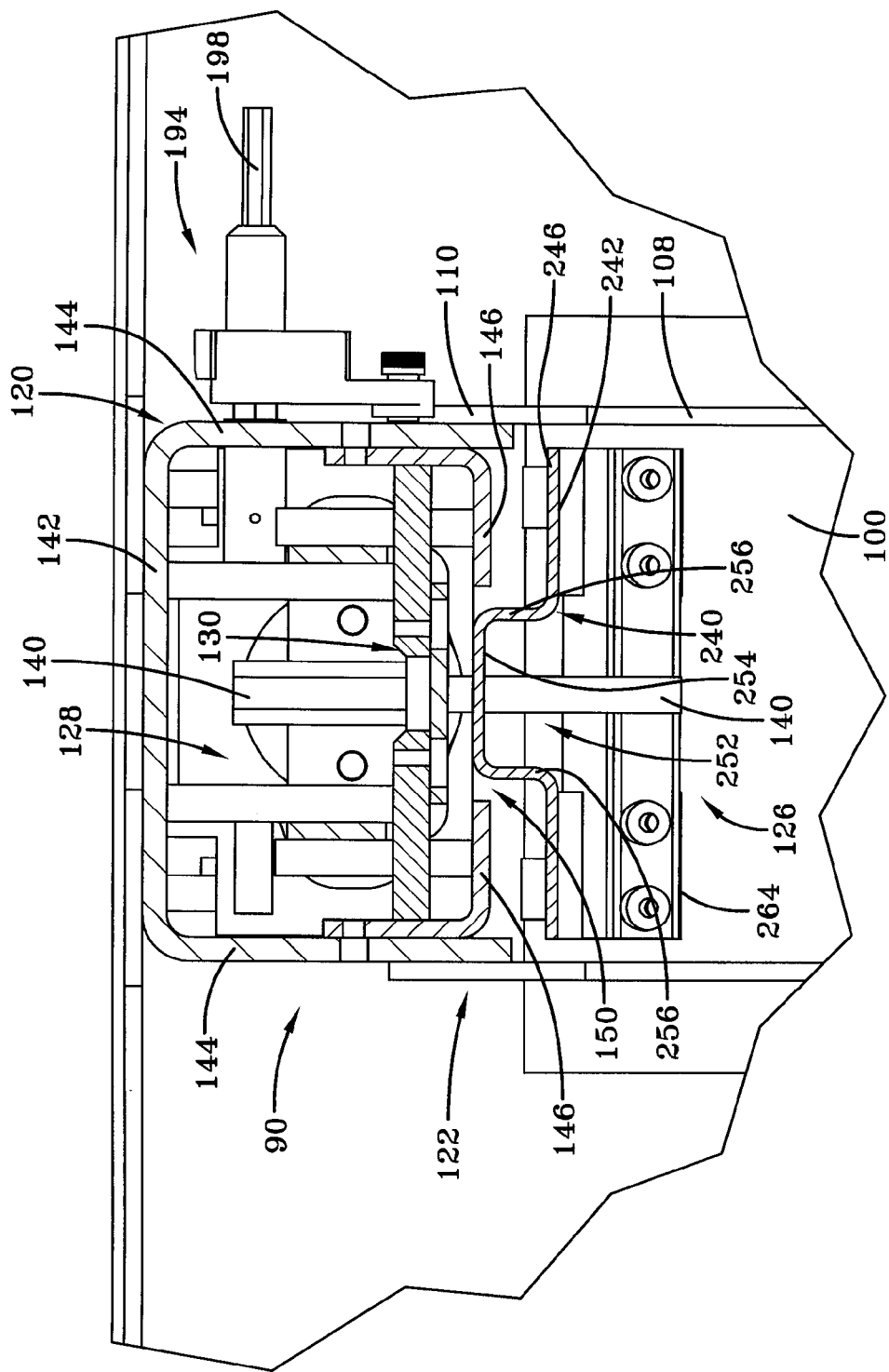
FIG. 6 is a cross-sectional view of the product carrier taken along lines 6-6 of FIG. 5 in accordance with the concepts of the present invention.
Figure 7:
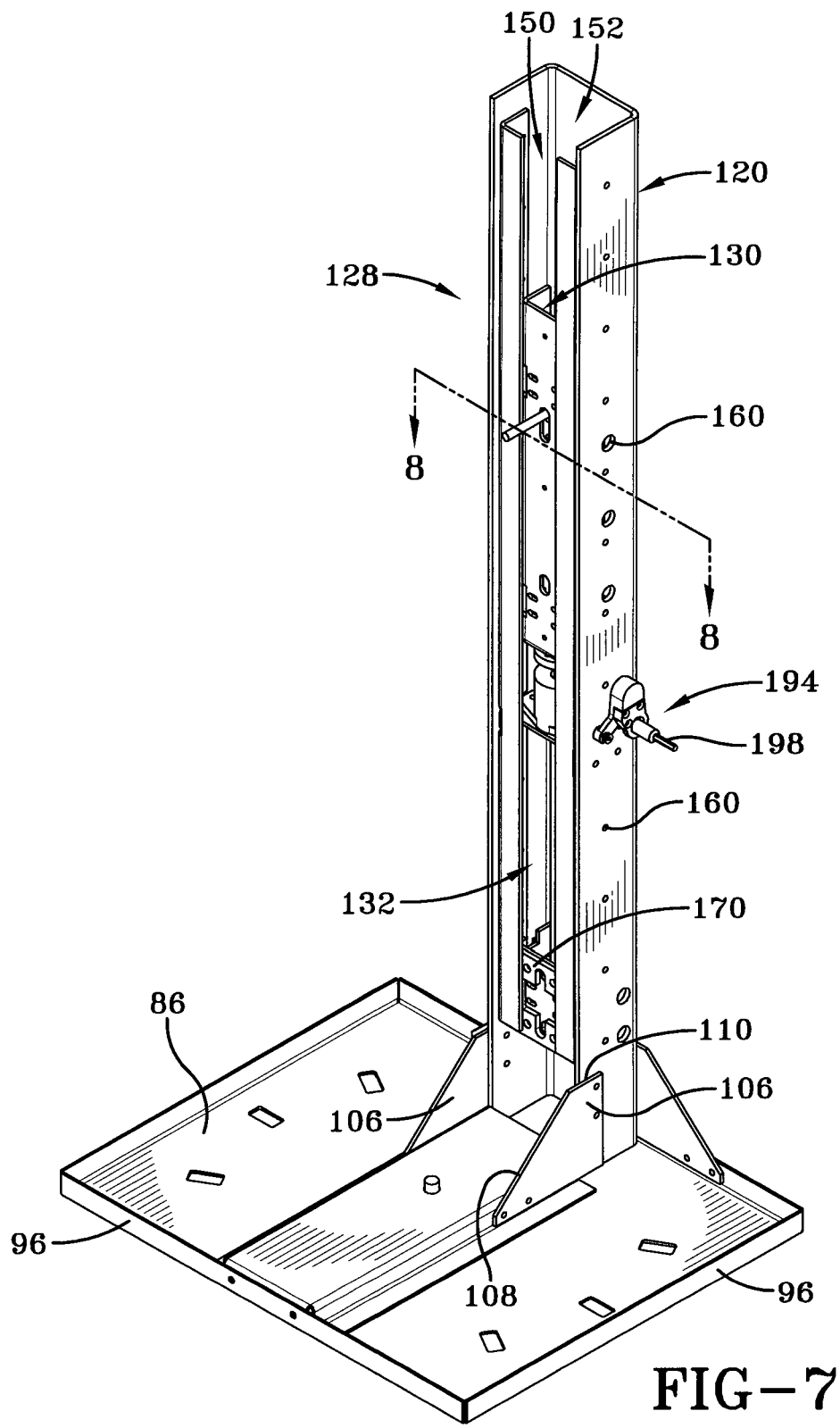
FIG. 7 is another perspective view of the product carrier with selected components removed.

As best seen in FIGS. 5, 6 and 7, the column 90 includes a column guide 120 that is fixed to the base 86 by at least the gussets 104 and 106 and other fasteners or welding or the like. A lifting assembly 122 is carried and maintained by the column guide 120. The lifting assembly includes an exterior lifting assembly 126, which is mounted outside of the column and supports the workpiece 64 as together they are moved vertically up and down in a manner to be described. The lifting assembly 122 also includes an interior lifting assembly 128 that is coupled to the exterior lifting assembly 126. The interior lifting assembly 128 is received within the column guide 120. The interior lifting assembly 128 includes a coupling column 130 that moves with the exterior lifting assembly 126, and a vertical adjuster 132, which is secured within the column and moves the coupling column 130 up and down. A workpiece pin 140 is connected to the coupling column 130 and extends from the interior lifting assembly 128 and the exterior lifting assembly 126 for a connection to the workpiece 64.

As best seen in FIG. 6, the column guide 120 includes a back wall 142 from which perpendicularly extends a pair of opposed sidewalls 144. Extending from the sidewalls at an edge opposite the back wall 142 are a pair of guide flanges 146. The opposed guide flanges 146 form a flange slot 150.

Figure 8:
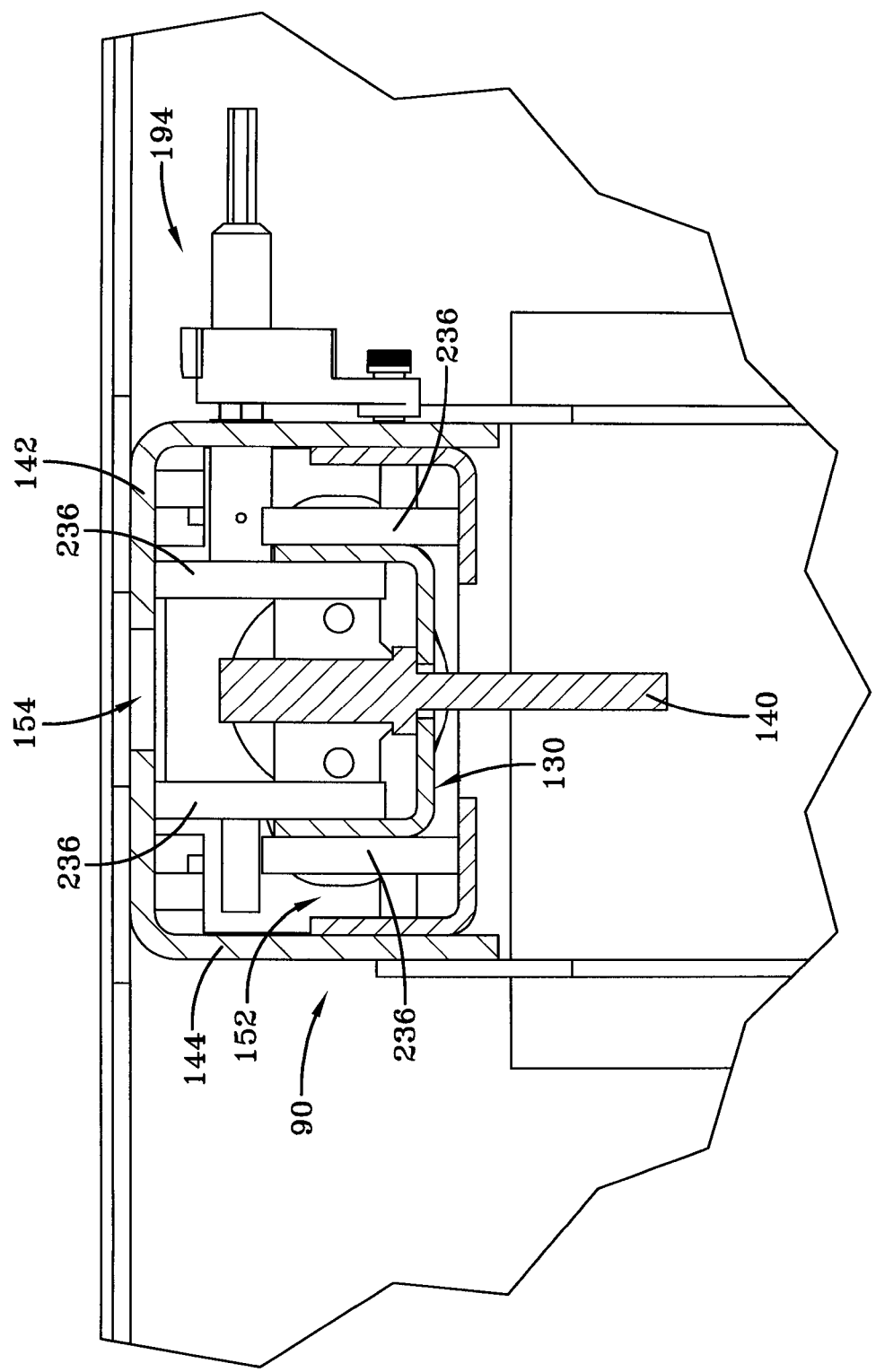
FIG. 8 is a cross-sectional view of a column guide and lifting assembly maintained in the product carrier taken along lines 8-8 of FIG. 7 in accordance with the concepts of the present invention.

As can be seen in FIGS. 5 and 8, the flange slot 150 extends substantially the entire length of the column guide 120. Together the back wall 142, the sidewalls 144, and the guide flanges 146, form a guide interior 152. The guide interior 152 receives and maintains the lifting assembly 122. A number of openings may be provided in the column guide 120 and in particular the back wall 142 and/or the sidewalls 144 to allow for securement of the interior lifting assembly 128 and to permit access so as to install and operate features of the lifting assembly. In particular, the back wall 142 may provide a plurality of access slots 154, which permit insertion of the workpiece pin 140. One sidewall 144 provides a drive port 156, while both sidewalls 144 provide a plurality of mounting holes 160.

Figure 9:
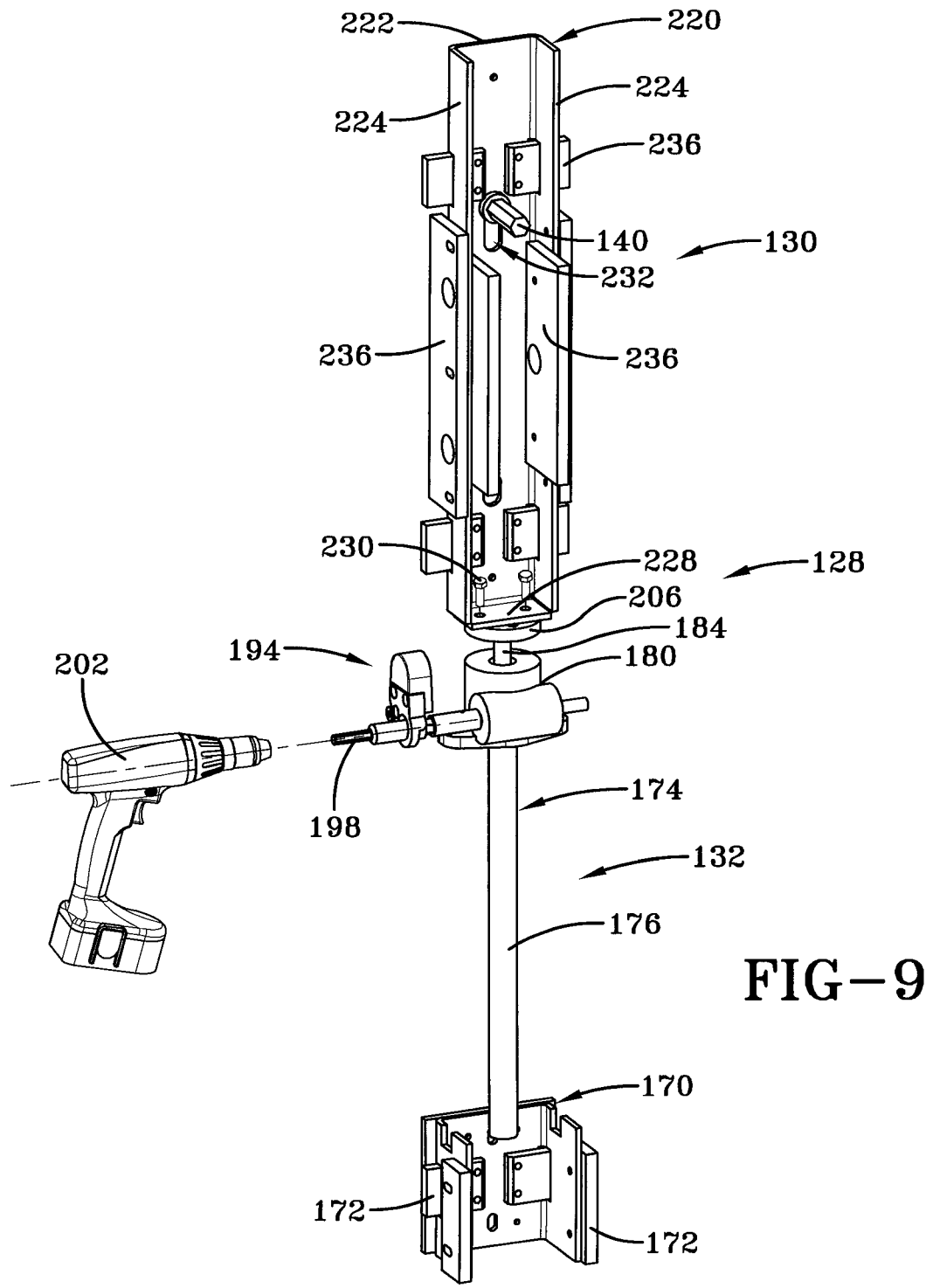
FIG. 9 is a perspective view of an interior lifting assembly maintained in the product carrier according to the concepts of the present invention.

As best seen in FIGS. 7-9, the interior lifting assembly 128 is received in the guide interior 152. In particular, the vertical adjuster 132 is mounted within a lower portion of the column guide. Also received and slidably movable within the guide interior 152 is an alignment base 170. As best seen in FIG. 9, the alignment base 170 is positioned around and, in one position, below the vertical adjuster. The alignment base 170 is connected to a lower end of the exterior lifting assembly 126 which is connected at its upper end to the coupling column 130. The alignment base includes a plurality of guide and/or alignment pads 172.

Figure 10:
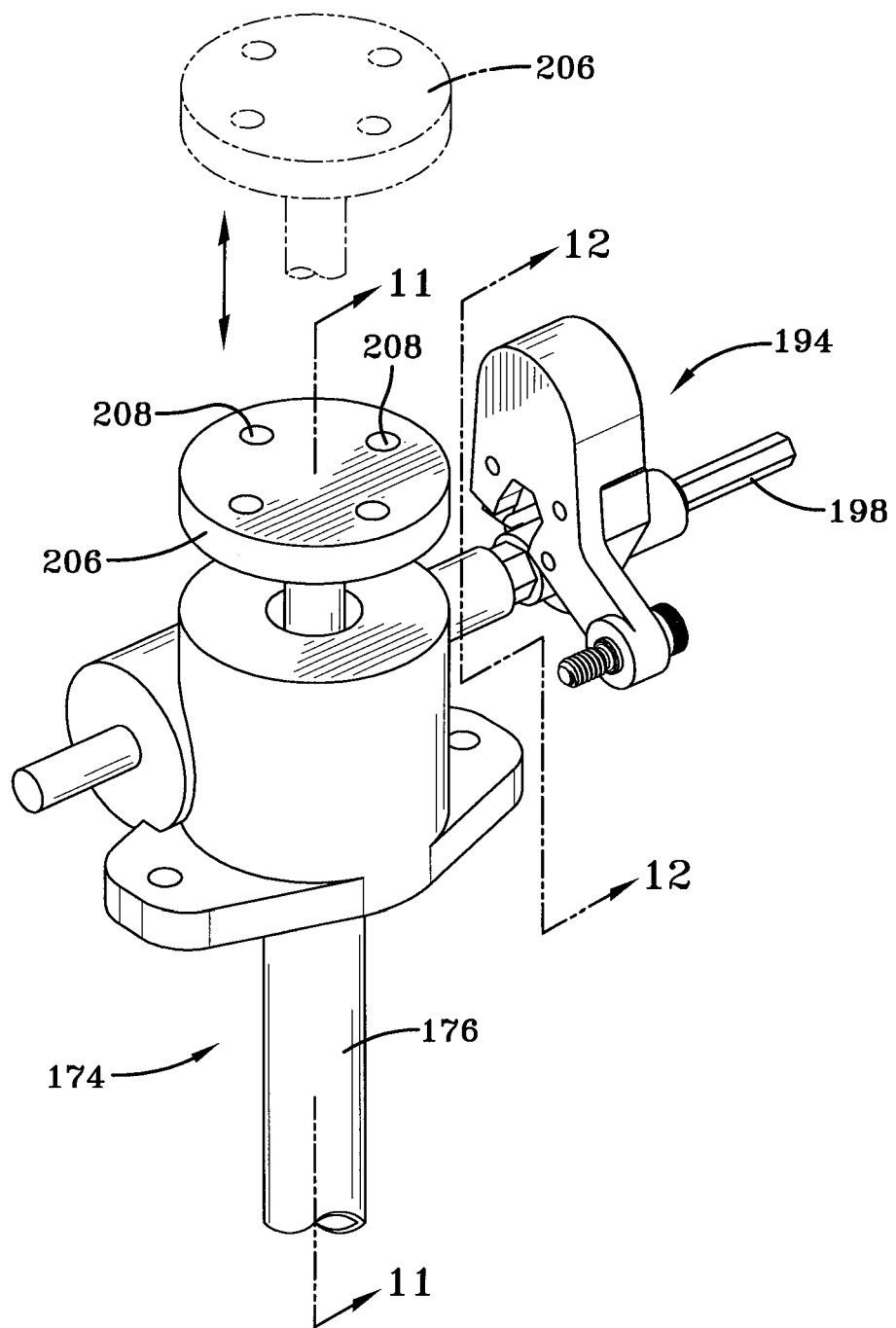
FIG. 10 is a partial perspective view of a vertical adjuster maintained by the interior lifting assembly according to the concepts of the present invention wherein a portion of the adjuster is shown in phantom to illustrate the movement of the adjuster.
Figure 11:
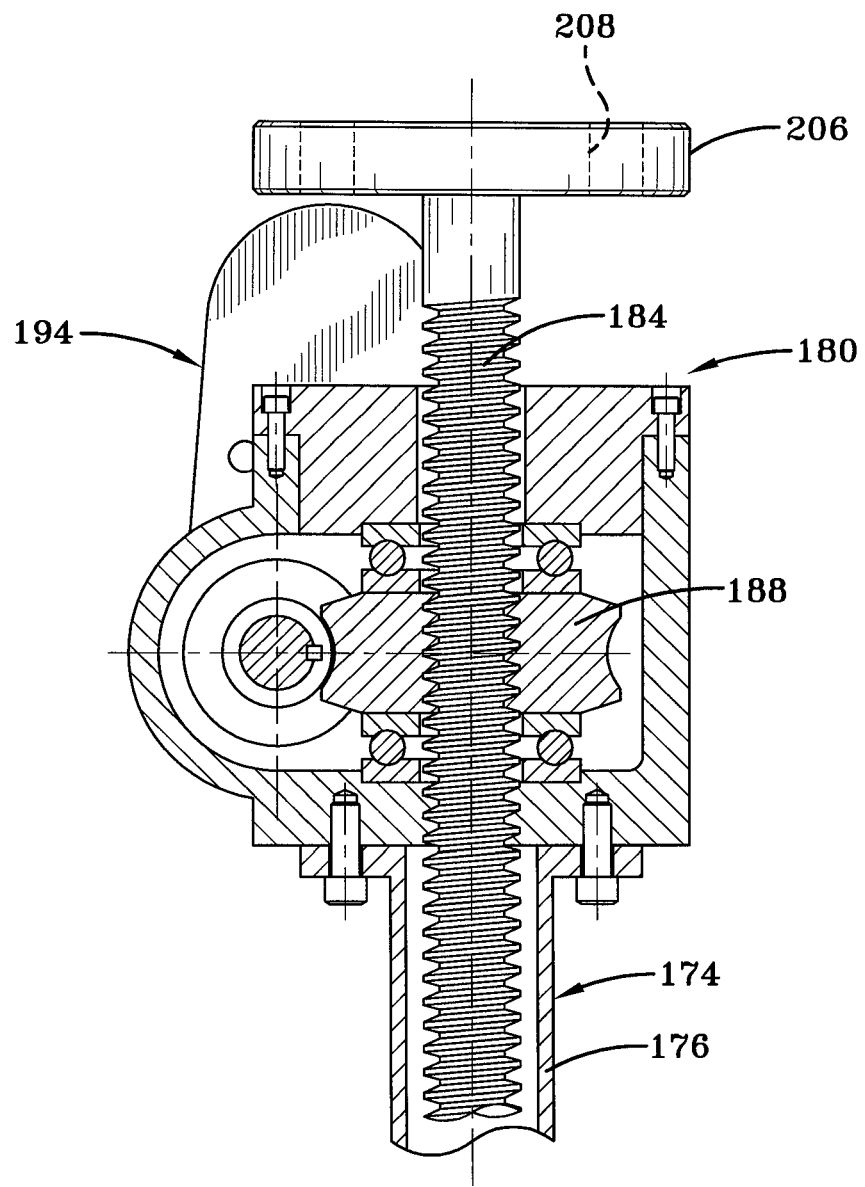
FIG. 11 is a cross-sectional view of the vertical adjuster taken along lines 11-11 of FIG. 10 showing a worm gear meshing with a drive gear of the vertical adjuster.

As best seen in FIGS. 9-11, interior lifting assembly 128 includes a screw jack assembly 174. The screw jack assembly 174 includes a jack tube 176. Mounted to the top of the tube 176 is a screw jack drive 180. Carried within the tube 176 is a worm gear 184. Laterally disposed adjacent to the worm gear 184 within the drive 180 is a drive gear 188. The drive gear meshes with the worm gear such that rotation of the drive gear vertically moves the worm gear in an up-and-down direction.

Figure 12:
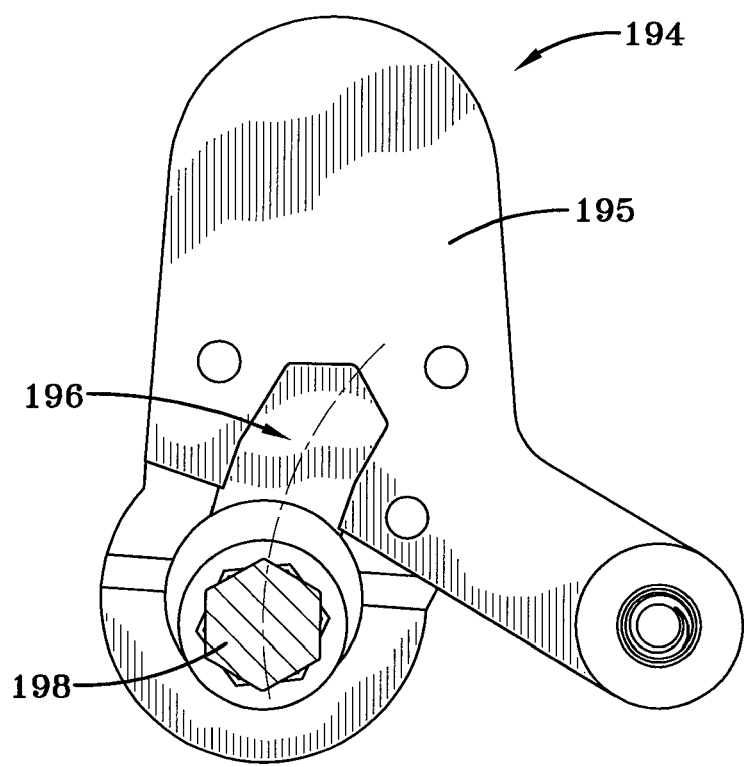
FIG. 12 is a cross-sectional view taken along lines 12-12 of FIG. 10 showing a locking mechanism associated with the vertical adjuster.

A drive gear lock assembly 194, as seen in FIG. 12, may be coupled to the screw jack drive 180 to prevent retraction (backspin) or movement when weight (force) is applied to a pedestal 206 which will be discussed as the description proceeds. The assembly 194 includes a pivotable lock cover 195, which may be spring biased, that has a cover slot 196. The assembly 194 is mounted to the column guide side wall 144. The drive gear pin 198 extends through the sidewall 144 and in particular through the drive port 156. As such, a user accesses the guide gear pin 198 by moving the cover 195 so that the drive pin 198 is no longer partially enclosed by the slot 196. A drill 202, which may be handheld and which may be pneumatically or electrically operated, mates with the drive gear pin 198 and rotates it so as to move the worm gear 184 in a corresponding vertical direction. Once the desired position is obtained, the drill is disengaged from the gear pin 198 and the cover pivots so that the slot 196 at least partially encloses and captures the gear pin 198 to preclude inadvertent rotation thereof. In other embodiments, the lock assembly 194 may not be provided. And in some embodiments the drive pin may be rotated manually with an appropriate tool.

Referring back to FIGS. 9-11, mounted to the top of the worm gear 184 is a pedestal 206 wherein the pedestal is independently rotatable with respect to the end of the worm gear 184. The pedestal 206 has at least one and in most embodiments a plurality of pedestal holes 208. The coupling column 130 is connected to the vertical adjuster 132. The coupling column includes a U-shaped bracket 220 having a spine 222 with a pair of opposed arms 224 extending from each edge of the spine 222. A plate 228 is provided at the bottom of the spine and may interconnect the bottom edge of each arm 224. The plate 228 is attachable to the pedestal 206 by fasteners 230 received through the plate 228 and the pedestal holes 208. Once the plate 228 is attached, the pedestal moves up or down with the worm gear 184, but does not rotate. At least one mounting slot 232 is provided in the spine 222 wherein the slot 232 is aligned with the flange slot 150 of the column guide 120. A plurality of bracket guides and/or alignment pads 236 are positioned along the arms 224 and the spine 222 such that movement of the coupling column within the column guide is relatively smooth and unencumbered.

Referring back to FIGS. 5 and 6, it can be seen that the exterior lifting assembly 126 includes a body 240. The body provides for a workpiece side 242 opposite a column side 246. The column side 246 is positioned adjacent the guide flanges 146. As a result, the workpiece side 242 faces the workpiece that is carried by the exterior lifting assembly. The body 240 includes a channel 252, which extends substantially along its length. The channel 252 is received in the flange slot 150 and is slidably movable therein. The channel includes a channel base 254 and channel sides 256, which extend from the channel base.

The channel base 254 is connected to the interior lift assembly 128 with appropriate fasteners. Accordingly, as the interior lifting assembly 128 moves, the exterior lifting assembly 126 moves. The exterior lifting assembly 126 also provides a plurality of guide and/or alignment pads 262 mounted thereon such that the guide and/or alignment pads prevent marring of the workpiece temporarily secured thereto. Extending from a bottom end of the body 240 is a lift arm 264, which in its lowermost position, is positionable to be flush with or slightly lower than the flat surface 110 of the column tray gussets 106. This allows for the user to position the workpiece onto the flat surfaces and then engage the lift arm 264 to the workpiece by slightly raising the lift arm. The workpiece pin 140 is positioned and secured to extend through the mounting slot 232 so that it may then be secured or otherwise mounted to the spine 222. The workpiece pin 140 extends away from the spine and through the exterior lifting assembly 126. In particular, the workpiece pin extends through the body 240 and specifically the channel base 254.

The channel base 254 may also be connected to the alignment base 170 with fasteners through the flange slot 150. In particular, a lower end of the body 240, and in particular a lower end of the channel base 254 may be connected to the alignment base 170. As a result, movement of the interior lifting assembly 128 moves the body 240, which in turn moves the alignment base 170. The alignment base 170 assists in stabilizing movement of the exterior and interior lifting assemblies to ensure that torque forces generated by the workpiece are evenly distributed about the column 90 and the base 86.

Referring to all of the drawings, it will be appreciated that the workpiece 64 is mountable and secured to the workpiece pin 140 such that the workpiece is in a desired vertical position. Although only one workpiece pin is shown, it will be appreciated that more than one pin may be utilized to properly secure the workpiece to the column 90. With the lift arm 264 placed in its lowest position, the user will mount the workpiece onto the lift arm and the workpiece pin so as to secure the workpiece to the lifting assembly 122. The user will then utilize the hand drill or other means to engage the vertical adjuster so as to move the exterior and interior lifting assemblies to a desired vertical position. Once the desired position is obtained, the drill is removed and the lock assembly is utilized to prevent accidental or unwanted vertical movement of the workpiece. Once the workpiece is adequately and securely mounted, the carrier can be moved along the conveyor table as desired to various workstations.

Based on forgoing, the advantages of a carrier with a column that maintains a vertically adjustable lifting assembly are readily apparent. As the workpiece is moved from station to station, the height of the workpiece can be adjusted as needed by the operator and based upon the manufacturing operation that needs to be performed. The disclosed configuration is further advantageous in that it is much less susceptible to tipping in view of the weight distribution provided by the base and the structural construction of the column.

Thus, it can be seen that the objects of the invention have been satisfied by the structure and its method for use presented above. While in accordance with the Patent Statutes, only the best mode and preferred embodiment has been presented and described in detail, it is to be understood that the invention is not limited thereto or thereby. Accordingly, for an appreciation of the true scope and breadth of the invention, reference should be made to the following claims.

What is claimed is:

1. A conveyor system comprising:
   a conveyor table having a platform surface, said platform surface having opposed platform edges that form a flow gap therebetween;
   a plurality of conveyor mechanisms which are load-bearing ball-transfers, said plurality of conveyor mechanisms extending from said platform surface and positioned away from said flow gap; and
   at least one guide pin assembly receivable in said flow gap, said at least one guide pin assembly comprising a guide pin having at least a portion thereof above said platform surface.

2. The conveyor system according to claim 1, wherein said platform surface has an underside forming a flow channel that is contiguous with said flow gap.

3. The conveyor system according to claim 2, wherein said at least one guide pin assembly comprises:
   a shaft sized to move in said flow gap and extend above said plurality of conveyor mechanisms; and
   a head extending radially from said shaft and sized to move in said flow channel.

4. The conveyor system according to claim 3, wherein said at least one guide pin assembly further comprises at least one washer carried by said shaft and disposed between said head and said platform surface.

5. The conveyor system according to claim 4, wherein said platform surface has angular platform edges that form a cross flow gap, said cross flow gap intersecting said flow gap, said shaft sized to move in said cross flow gap.

6. The conveyor system according to claim 4, further comprising a marker extending from said platform surface and positioned adjacent said flow gap.

7. The conveyor system according to claim 4, wherein said at least one washer is made of ultra-high-molecular-weight polyethylene material and is positioned immediately adjacent said platform surface.

8. The conveyor system according to claim 3, further comprising:
   a carrier having a base with a pin hole therethrough, said pin hole receiving said shaft therethrough; and
   a nut securable to said shaft so that said base is in at least partial contact with and moveable on said plurality of conveyor mechanisms.

9. The conveyor system according to claim 8, further comprising:
   a column vertically extending from said base and adapted to carry a workpiece, wherein said column is adjustable to move the workpiece to a desired height.

10. A carrier for a workpiece comprising:
    a base;
    a column extending vertically from said base; and
    a lifting assembly carried by said column and movable with respect to said column, said lifting assembly comprising:
       an interior lifting assembly maintained within said column and having a drive gear and a vertical adjuster; and
       a workpiece pin extending from said interior lifting assembly and adapted for connection to the workpiece, wherein rotation of said drive gear moves said vertical adjuster,
    wherein said vertical adjuster comprises:
       a screw jack assembly maintaining a worm gear engaged by said drive gear; and
       a pedestal connected to said worm gear such that rotation of said drive gear moves said worm gear which moves said pedestal and said workpiece pin which is adapted to carry a workpiece.

11. The carrier according to claim 10, wherein said column comprises:
    a column guide having a flange slot contiguous with a guide interior; and
    wherein said
       interior lifting assembly is maintained within said guide interior; and
       said workpiece pin extends from said interior lifting assembly through said flange slot and is adapted for connection to the workpiece.

12. The carrier according to claim 11,
    wherein said drive gear is associated with said interior lifting assembly, such that rotation of said drive gear moves said workpiece pin in said guide slot.

13. The carrier according to claim 12, wherein said interior lifting assembly comprises:
    a coupling column connected to said vertical adjuster, said workpiece pin extending from said coupling column.

14. The carrier according to claim 13, wherein said
    pedestal is connected to one end of said worm gear, said pedestal connected to said coupling column such that rotation of said drive gear moves said coupling column within said column.

15. The carrier according to claim 14, further comprising:
    an exterior lifting assembly connected to said coupling column, said workpiece pin extending through said exterior lifting assembly, wherein the workpiece is adapted to be mounted to the exterior lifting assembly via the workpiece pin.

16. The carrier according to claim 15, wherein said exterior lifting assembly comprises:
    a body having at least one wear pad facing the workpiece; and
    a lifting arm extending from said body and adapted to carry at least a portion of the workpiece.

17. The carrier according to claim 16, further comprising:
    a guide pin assembly movable in a conveyor table; and
    said base having a hole therethrough for connection to said guide pin assembly.

18. A carrier for a workpiece comprising:
a base;
a column extending vertically from said base;
a lifting assembly carried by said column and movable with respect to said column, said lifting assembly adapted to carry a workpiece;
a workpiece pin extending from said lifting assembly and adapted for connection to the workpiece; and
a drive gear associated with said lifting assembly, wherein rotation of said drive gear moves said workpiece pin along said column.

19. The carrier according to claim 18, further comprising:
a guide pin assembly movable in a conveyor table; and
said base having a hole therethrough for connection to said guide pin assembly.

\* \* \* \* \*